(No Model.)
I. B. DAVIS.
MACHINE FOR MAKING BOILER HEADS.
No. 522,199.  Patented July 3, 1894.
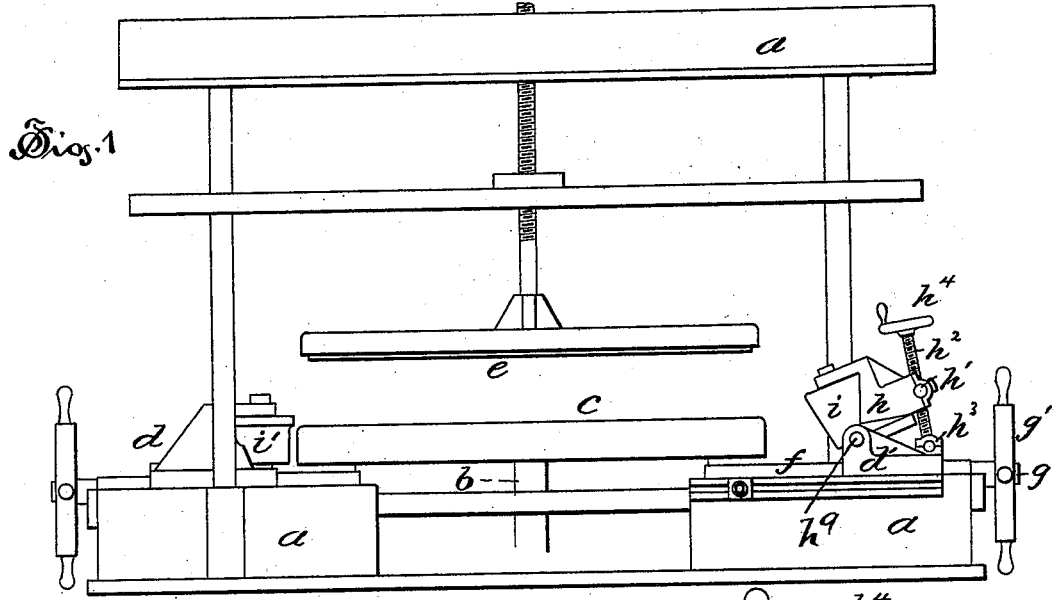
Fig. 1
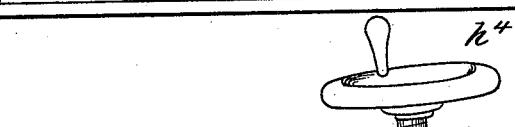
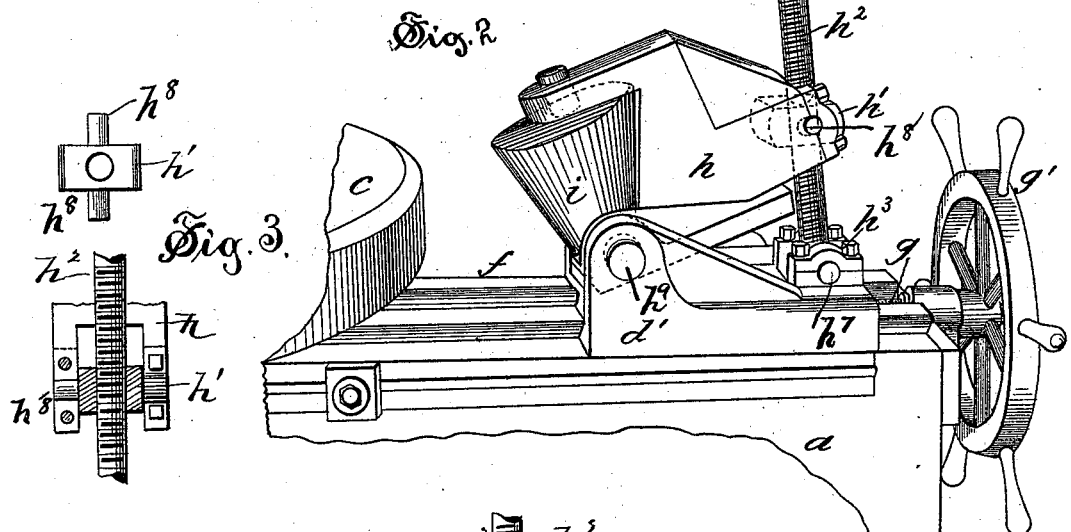
Fig. 2
Fig. 3
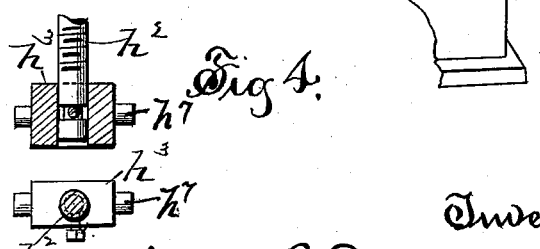
Fig. 4
Witnesses:
Harry P. Williams.
A. B. Jenkins.
Inventor,
Isaac B. Davis
by Simonds & Burdett,
attys
THE NORRIS PETERS CO., PHOTO-LITHO., WASHINGTON, D. C.

UNITED STATES PATENT OFFICE.

ISAAC B. DAVIS, OF HARTFORD, CONNECTICUT.

MACHINE FOR MAKING BOILER-HEADS.

SPECIFICATION forming part of Letters Patent No. 522,199, dated July 3, 1894.

Application filed December 22, 1888. Serial No. 294,439. (No model.)

*To all whom it may concern:*

Be it known that I, ISAAC B. DAVIS, of Hartford, in the county of Hartford and State of Connecticut, have invented certain new and useful Improvements in Machines for Making Boiler-Heads, of which the following is a full, clear, and exact description, whereby any one skilled in the art can make and use the same.

My within described invention relates particularly to and is an improvement on the machine that forms the subject-matter of my application filed January 6, 1888, Serial No. 259,985; the object of the improvement being to provide an improved means for breaking down and forming the flange of the boiler head, and my improvement consists in the combination of the adjustable and tilting forming roll with the rotary former bearing the head, and in details of the carriage and forming roll and their combination, as more particularly hereinafter described and pointed out in the claims.

Referring to the drawings: Figure 1 is a view in side elevation of my improved device as applied to the head forming machine. Fig. 2 is a detail perspective view of the adjustable forming roll, with parts broken away to show construction. Fig. 3 are detached views of the nut $h'$ and tilting bearer, and Fig. 4 are similar views of the block carrying the lower end of screw $h^2$.

In the accompanying drawings the letter $a$ denotes the frame of the machine that is made of any convenient form and material and supports a rotary shaft $b$, to the outer end of which is secured a former $c$. Upon opposite sides of this former are arranged ways in which the adjustable carriages $d$, $d'$ are moved toward and from the former $c$. The rotary shaft supporting the former is driven by any convenient means, and is connected by belt or gear with any suitable source of power, as the main driving shaft or a steam engine. The clamp $e$ is supported above the former in position to hold firmly between the former and clamp a heated disk-shaped plate that is to be flanged by the operation of the machine. The carriage $d'$ is supported on the way $f$ that extends to the right of the frame, as shown in the drawings, and this carriage is moved toward and from the former $c$ by means of a screw-shaft $g$ that is held against longitudinal movement in the frame and takes into a threaded portion in the carriage. The outer end of the feed-screw $g$ is provided with a hand wheel $g'$, or other suitable device for turning the screw.

The carriage $d'$ which as before stated is moved longitudinally on the way $f$ by the screw $g$ is provided near its inner end with upwardly projecting side ears in which are journaled the trunnions $h^9$ of the bearer $h$ the said trunnions being below the working or clamping face of the former $c$. The outer end of this bearer is recessed and provided with half bearings which latter together with the caps thereon form bearings for the trunnions $h^8$ of the nut $h'$; this nut is screw threaded internally and is mounted on the screw $h^2$, which latter is mounted in the swinging block $h^3$ as shown in Fig. 4 and provided at its upper end with hand wheel $h^4$. The block $h^3$ is journaled in bearings formed near the outer end of carriage $d'$ and allows the screw to tilt as the outer free end of the bearer $h$ is moved up or down. The front end of the bearer $h$ is cut away to receive the rotary forming roll $i$ journaled at its upper and lower ends in the overlapping portions of the bearer. This roll $i$ which may be cylindrical or made tapering as shown, may be cylindrical or any other desired shape; and extends above the working face of the former so as to overlap the metal disk to be flanged. The edge of a blank extends beyond the edge of the former and by means of the feed-screw $h^2$ the position of the face of the forming roll $i$ is so located as to break down the edge of the blank [that has been suitably heated before securing it to the former] and then as the angle of the bent-over edge with respect to the edge of the former increases the position of the surface of the forming roll is changed by means of the feed-screw $h^2$, and the whole carriage $d'$ is also moved up toward the former by the operation of the main feed-screw $g$.

By locating the pivotal attachment $h^9$ of the bearer $h$ below the clamping face of the former, the pressure of the roll $i$ on the projecting portion of the disk, instead of causing the disk to warp up between its outer edge and the edge of the clamp as it would do if the pivotal point of the bearer were above the plane of the top of the former, tends to draw the disk outwardly and hold it solidly on the former, so that an accurate and true gage can be obtained. When there is a warped surface of the plate back of its edge, it is necessary to take it out which is done by reheating the plate and using a mallet or hammer which forms a tight place, that is a place where the metal is under a greater strain, either of compression or tension than the surrounding part of the plate. And furthermore by this truing up the surface of the plate, the shape of the periphery and the gage or diameter of the space inclosed by the flange is changed, that is the flange is thrown out of true and out of gage. By avoiding the warping of the plate, I obviate the necessity of truing up and a plate is formed absolutely true to gage depending on size of the former. By means of this forming roll a boiler-head secured to the former may be flanged rapidly and without regard to the angle that the disk or blank makes with the edge of the roll, the adjustability of the forming roll enabling the workman to place the surface of the forming roll in suitable position to break down the blank as well as to partly finish it. The finishing roll i', however, is arranged upon the opposite side of the machine and borne in an adjustable carriage so that it may be fed up against the flanged edge of the blank.

I claim as my invention—

1. The combination with a rotary former and clamp, of a carriage movable toward and away from the former, a bearer pivoted to the carriage at or near the inner end of the latter and below the working face of the former, a roller in the bearer, a nut having trunnions supported in bearings in the outer or free end of the bearer, a screw swiveled at its lower end in the carriage and passing through the nut whereby to tilt the bearer when turned, and means for moving the carriage, substantially as set forth.

2. The combination with a rotary former provided with a beveled edge and a clamp, of a movable carriage, a bearer pivoted to the carriage, a tapering bearing roll carried by the bearer, and a screw swiveled in the carriage and passed through a nut pivotally connected with the bearer, substantially as set forth.

ISAAC B. DAVIS.

Witnesses:
H. E. BACHARACH,
A. B. JENKINS.